United States Patent [19]

Duncan, Jr. et al.

[11] Patent Number: 5,779,236
[45] Date of Patent: Jul. 14, 1998

[54] VACUUM HOLD DOWN CONVEYOR SYSTEM WITH REDUCED NET DOWNWARD FORCE ON A BELT

[75] Inventors: Marvin H. Duncan, Jr.; Dan Haferman, both of Marblehead, Mass.

[73] Assignee: Cutting Edge, Inc., Marblehead, Mass.

[21] Appl. No.: 711,947

[22] Filed: Sep. 6, 1996

Related U.S. Application Data

[60] Provisional application No. 60/003,437 Sep. 8, 1995.

[51] Int. Cl.⁶ ................................................. B65H 5/02
[52] U.S. Cl. .......................... 271/276; 271/197; 198/689.1
[58] Field of Search ................................. 271/7, 276, 196, 271/177, 94, 322; 198/847, 689.1

[56] References Cited

U.S. PATENT DOCUMENTS

| | | | |
|---|---|---|---|
| 3,198,517 | 8/1965 | Martin | 271/276 |
| 3,889,801 | 6/1975 | Boyer | 271/197 |
| 4,207,579 | 6/1980 | Gamblin et al. | 271/7 |
| 5,139,253 | 8/1992 | Bohme et al. | 271/197 |

FOREIGN PATENT DOCUMENTS

| | | | |
|---|---|---|---|
| 404085234 A | 3/1992 | Japan | 271/197 |
| 1052367 | 12/1966 | United Kingdom | 271/197 |

*Primary Examiner*—H. Grant Skaggs
*Attorney, Agent, or Firm*—Cumpston & Shaw

[57] ABSTRACT

A vacuum hold down conveyor system employing a vacuum table with a plurality of suction grooves and relief grooves extending parallel to a direction of travel. A vacuum generator is fluidly connected to the suction grooves to create a sub-ambient pressure in the suction grooves. A belt is translatable relative to the vacuum table to simultaneously occlude the suction and the relief grooves. The relief grooves are exposed to a pressure greater than the suction grooves to thereby reduce the net downward force on the belt as it translates across the vacuum table.

8 Claims, 3 Drawing Sheets

VACUUM HOLD DOWN CONVEYOR SYSTEM WITH REDUCED NET DOWNWARD FORCE ON A BELT

This application is from Provisional application Ser. No. 60/003,437 filed Sep. 8, 1995.

FIELD OF THE INVENTION

The present invention relates to systems for cutting a sheet material, and more particularly, to a vacuum hold down conveyor system having a belt which is translatable relative to a vacuum table, wherein the vacuum table includes recesses for exposing a first portion of the belt to a suction pressure and a second portion of the belt to a greater relief pressure.

BACKGROUND OF THE INVENTION

The automation of sheet material cutting generally requires a segment of the sheet material be fixedly but releasably held relative to a support surface. The retention of the sheet material on the support surface has previously been achieved through releasable adhesives, freezing liquids, overlays and pressure differentials. The use of pressure differentials includes the creation of a vacuum (reduced pressure) under the sheet material, which creates a pressure differential between the top and bottom of the fabric, which results in a downward force on the fabric thereby retaining the fabric in the necessary location.

Process times are further reduced by exposing greater quantities of material to an automated cutting assembly without requiring human intervention. Therefore, conveyor or belt systems have been employed to automatically advance segments of a sheet material to a cutting station and remove the cut material from the cutting station.

In a cutting system employing an endless flexible moveable belt, the belt continually revolves about at least a pair of rollers. The belt functions as a support surface upon which the fabric is disposed, transported and cut. To retain the segment of sheet material relative to the belt during the cutting operation, the belt moves over a stationary vacuum assembly to expose a length of the belt to the vacuum. However, as a pressure differential is created between the side of the belt exposed to the fabric and the side of the belt exposed to the vacuum table, the belt is pressed to the vacuum table with a force that is equal to the pressure differential multiplied by the effective area of the belt exposed to the pressure differential. While the pressure differential may not be high, the relatively large area of the belt results in a substantial downward force on the belt. This downward force can inhibit translation of the belt relative to the vacuum table during operation of the vacuum system. To overcome this relatively large force, drive and tension rollers are employed to translate the belt relative to the vacuum table.

Therefore, the need exists for a cutting system having a vacuum hold down conveyor system with a reduced rolling resistance. The need further exists for a hold down system that can cooperate with a wide variety conveyor or belt types. The need also exists for a conveyor hold down system that can be adjusted to vary the net downward force on the conveyor.

SUMMARY OF THE INVENTION

The present invention provides a vacuum hold down conveyor system having a reduced vacuum induced downward force on a translatable belt when subject to operating pressures. The reduced downward force obviates previous system requirements necessary to translate the belt. In addition, the present invention allows more accurate translation of the belt, as less resistive forces must be overcome.

Generally, the present invention includes a vacuum table having a surface with plurality of isolated recesses; and a vacuum system coupled to less than all of the recesses for creating a pressure differential between the recesses. A translatable belt overlies the recesses such that a pressure differential is created across the belt, with portions of the belt exposed to a suction pressure and other portions simultaneously exposed to a greater relief pressure. That is, substantially less than the entire area of the belt that is supported by the vacuum table is exposed to a suction pressure.

In a specific embodiment, the present invention includes an endless flexible belt having a plurality of vacuum apertures disposed in parallel columns extending along the length of the belt.

The vacuum table includes longitudinal suction grooves aligned with the aperture columns in the belt for exposing the apertures to a vacuum. The suction grooves may be fluidly connected to a vacuum source. Air is thereby drawn through a fabric to the top or supporting surface of the belt, through the apertures in the belt and into a corresponding suction groove or channel in the vacuum table and finally from the suction groove into the manifold and to the vacuum source.

The present vacuum table also includes a plurality of relief channels or grooves extending substantially parallel to the suction channels. The relief grooves are exposed to a pressure greater than the suction grooves, thereby reducing the net pressure differential across the area of the belt supported by the vacuum table. Therefore, the net downward force on the belt is reduced. By limiting the area upon which the pressure differential acts to substantially coincide with (or equal) the area of the suction grooves exposed to the belt, the net downward force is reduced while maintaining substantially the same pressure differential across the sheet material to be held down. Alternatively, the relief channels may be exposed to a positive pressure from a separate source or the exhaust of a vacuum generation system, thereby further reducing the net downward force applied by the suction grooves.

DETAILED DESCRIPTION OF THE PREFERRED EMBODIMENTS

Figure 1:
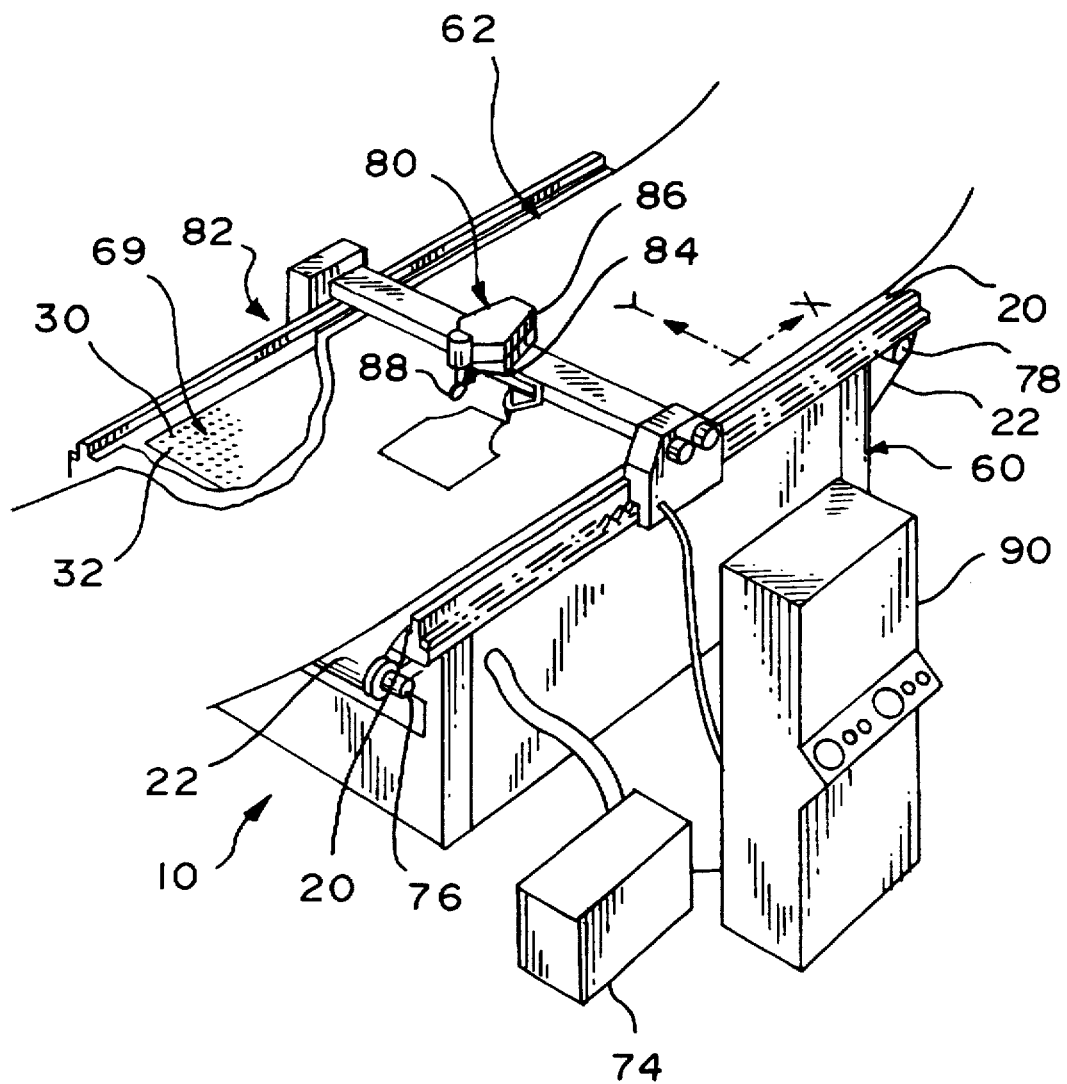
FIG. 1 is a perspective view of a conveyor cutting system.

Referring to FIG. 1, the present invention is employed in a cutting system 10 having a support surface 20 such as a movable conveyor or belt 22, a vacuum table assembly 60 for supporting a portion of the belt 22 and a cutting assembly 80 for operatively engaging the portion of the belt supported by the vacuum table assembly so as to cut a section of the sheet material. The belt 22, vacuum table assembly 60 and cutting assembly 80 may be operably connected to and controlled by a controller 90.

The Belt

The belt 22 is the surface upon which the sheet material is retained when cut. The belt 22 is formed in an endless loop and rotates about at least a pair of spaced apart rollers 106, 108. A length of the belt 22, corresponding to a cutting station 82 is supported by the vacuum table assembly 60. The belt 22 has a supporting surface 24 for supporting a segment of the sheet material and a table contacting surface 26 for operably engaging the vacuum table assembly 60. Depending upon the parameters of the cutting assembly 80, the belt 22 may be any of a variety of materials. In the present configuration, the belt 22 is employed with a wheel cutter 88 and must accommodate a slight penetration by the cutter during the cutting process. The belt 22 must also be sufficiently flexible to be rotated about tension and drive rollers. At least one of the rollers 106, 108 is a drive roller for causing rotation of the belt about the rollers. In addition, tensioning rollers may contact the belt 22 to provide further control for the belt transport. The belt 22 is formed of a material such as polyurethane and has a thickness of approximately 1/8 inch.

Figure 3:
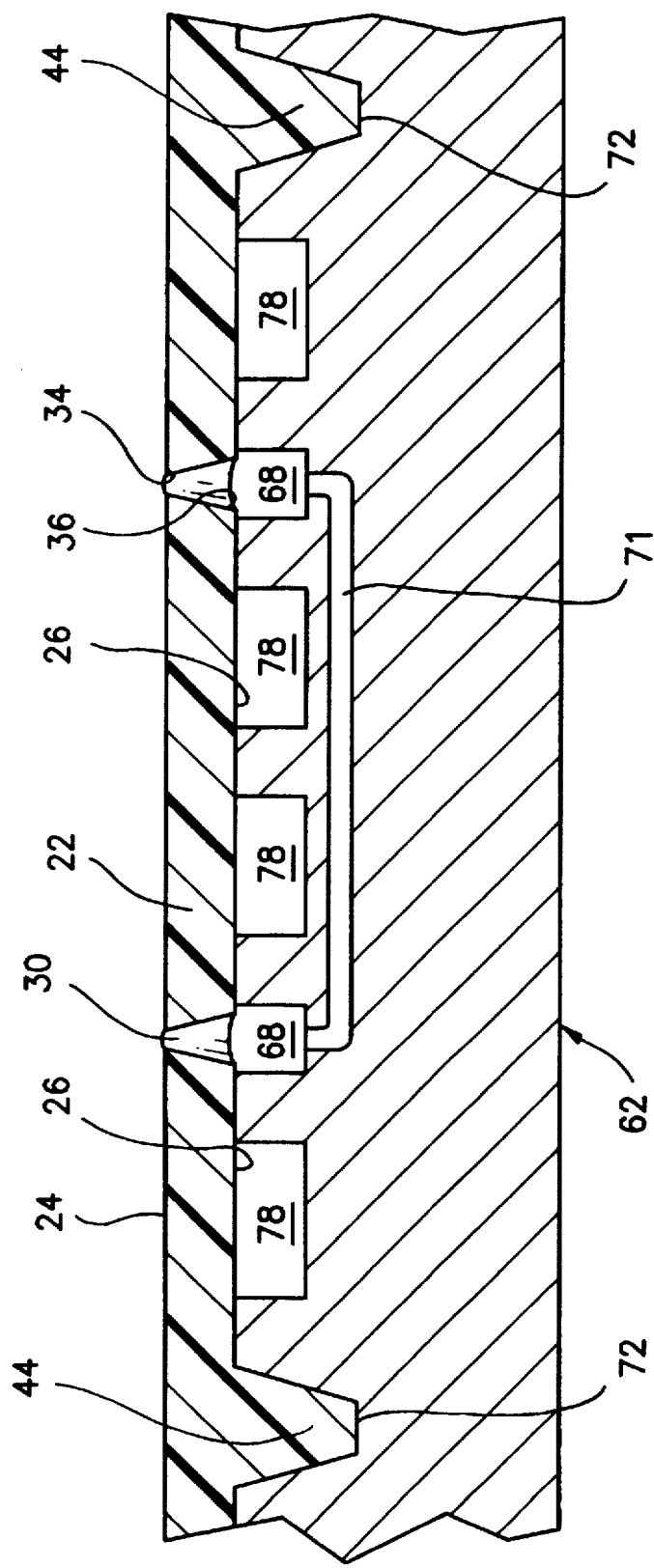
FIG. 3 is an end elevational cross sectional exploded view of a conveyor and vacuum table.

Depending on the particular material of the belt 22, the belt may include a plurality of vacuum apertures 30, through which a pressure differential is communicated. However, some belt materials are sufficiently microporous so that macro or formed apertures are not required to communicate a pressure differential across a thickness of the belt material. In a preferred embodiment of the present invention, the belt 22 includes a multiplicity of apertures 30 for exposure to a vacuum and exposure to the section of sheet material to be cut. Specifically, the belt 22 includes a plurality of aperture columns 32 extending along the length of the belt. As shown in FIG. 3, in the present embodiment, the apertures 30 have a frusto conical cross-section, wherein a smaller diameter 34 is at the top or supporting surface 24 of the belt and a large diameter 36 is at the bottom or table contacting surface 26, which is immediately exposed to the vacuum table assembly. The apertures 30 have a diameter of approximately 0.010 inches at the top surface and are tapered to approximately 0.020 inches at the bottom surface. The apertures 30 are spaced apart along the length of the belt at an approximately 1/16 inch intervals.

It has been found these apertures 30 may be readily formed by laser cutting or ablation of the belt. A carbon dioxide laser has been successfully used to form the apertures 30. However, it is understood that the apertures 30 may be formed by any of a variety of means such as mechanical punch, chemical treatment, or the belt may have a sufficient microporousity to obviate the formation of macro apertures.

The belt 22 may also include guide ridge 44 or ridges extending along a length of the belt. Preferably, the guide ridge 44 extends along the length of the belt 22 having the apertures 30. The guide ridge 44 may also be disposed at any of a variety of locations along the direction of belt travel. That is, the guide ridge 44 may extend along the belt 22 adjacent to an edge of the belt. The guide ridge 44 may have any of a variety of cross sectional configurations, including triangular, square, trapezoidal or arcuate. Further, the belt 22 may include more than one guide ridge 44. In a preferred embodiment, the belt 22 includes a pair of guide ridges 44, wherein one ridge extends along each edge of the belt. The guide ridges 44 have a trapezoidal cross section with a height of approximately one half inch.

Vacuum Table Assembly

Figure 2:
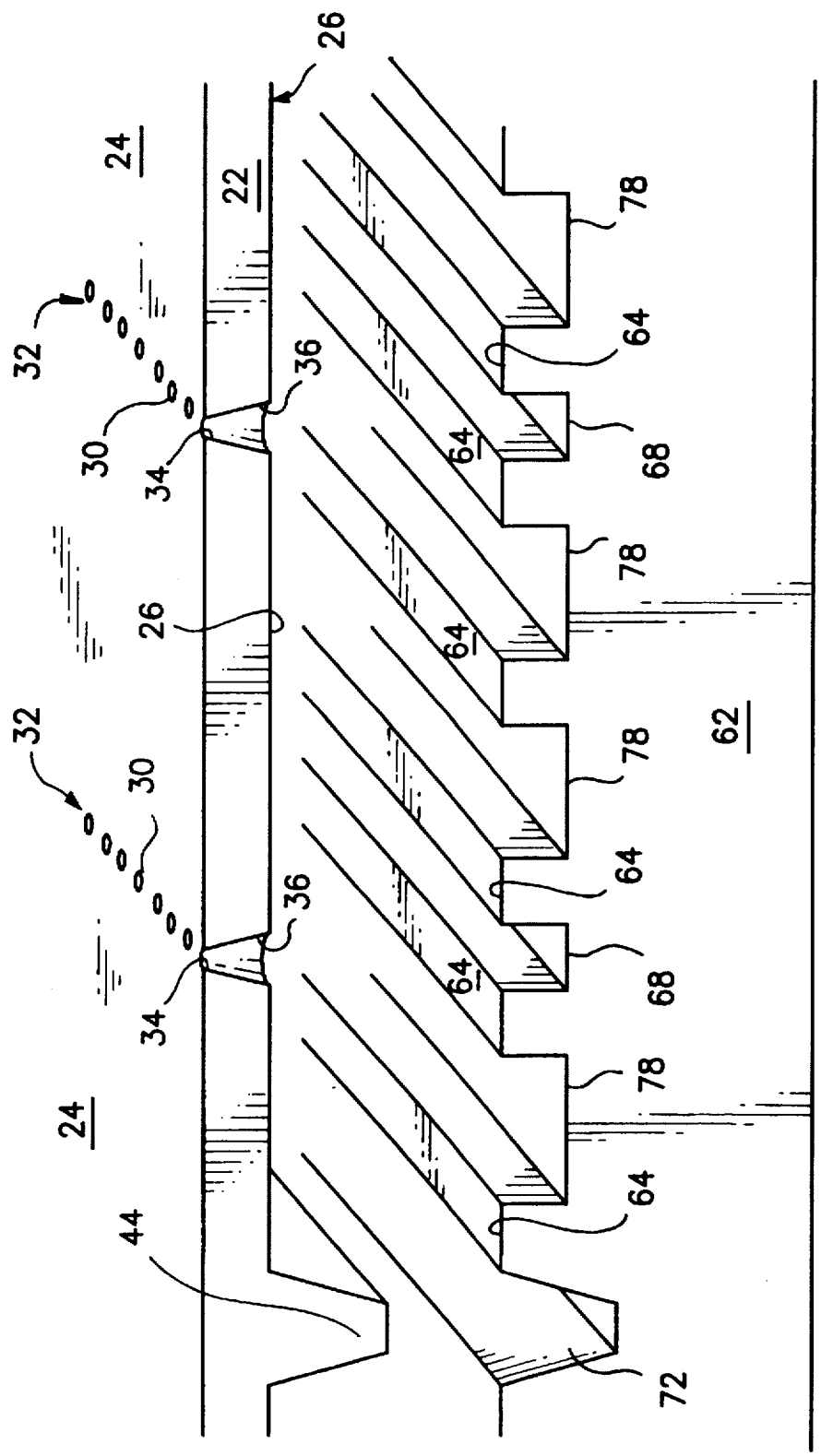
FIG. 2 is a partial cross sectional prospective view of a vacuum table and conveyor assembly.

Referring to FIGS. 2 and 3 the vacuum table assembly 60 includes a vacuum table 62 and a vacuum generator 74. The vacuum table 62 is a rigid member having sufficient rigidity to sustain the downward force of the cutting assembly 80 during the cutting operation. Preferably, the vacuum table 62 is formed of a substantially air impervious material. That is, the vacuum table 62 readily permits a pressure differential across a relatively small section of the table. Thus, the vacuum table 62 can be formed out of any of a variety of materials such as plastic, metal, alloy or composites. In the present embodiment, the vacuum table 62 is formed of polyethylene.

As shown in FIGS. 2 and 3 the vacuum table 62 has a belt supporting surface 64 for supporting the portion of the belt 22 that is then exposed to the cutting operation. The belt supporting surface 64 includes at least one suction area recess 66 and at least one relief area recess 76. Preferably, the suction area recess 66 is configured as a plurality of suction grooves 68 extending parallel to the direction of belt travel relative to the vacuum table 62. Preferably, the relief area recess 76 is configured as a plurality of relief channels 78, wherein the relief channels also extend parallel to the direction of belt travel relative to the vacuum table 62. As shown in FIG. 3, in one embodiment, the relief channels 78 are disposed in a pattern with the suction grooves 68 across the width of the vacuum table 62. Specifically, there are two relief channels 78 between each suction channel 68. That is, the pattern across the width of the vacuum table 62 runs relief channel, suction channel, relief channel, relief channel, suction channel, relief channel . . .

However, it is understood the suction and relief area recesses 66, 76 may be any configuration and pattern, so long as they are disposed in the belt supporting surface 64 of the vacuum table 62 and are exposed to and support a portion of the belt 22 during the cutting operation. Preferably, the suction and relief area recesses 66, 76 do not fluidly communicate through the material of the vacuum table. It is understood, although the vacuum table 62 is shown as a horizontal planar member, the vacuum table may be any of a variety of configurations such as a drum, inclined plane or surface.

In the present embodiment, the suction grooves 68 are cooperatively aligned with the aperture columns 32 in the belt 22 so that the aperture columns are exposed to the suction grooves as the belt travels over the vacuum table 62. The suction grooves 68 are generally formed with a sufficient width to provide a tolerance so that a slight variation in the linearity of the aperture columns 32 or wobble in the belt travel will not prevent exposure of an aperture 30 to the corresponding suction groove. Therefore, in an embodiment of the present invention, the suction or vacuum groove 68 has a width of at least that of the smallest diameter 34 of the aperture 30 in the belt 22. In the present embodiment, the vacuum groove 68 has a width of at least 0.010 inches, to avoid forming a constriction in the vacuum system. To accommodate for tolerances in alignment between the apertures 30 in the belt 22 and the suction grooves 68 in the vacuum table 62, the suction groove is preferably plus or minus 0.045 inches from the diameter of the suction aperture in the belt. Therefore, the suction groove width may range from approximately 0.060 inches to 0.125 inches. The suction grooves 68 have a preferable width of 0.090 inches and are located every 3/4 inch across the effective width of the belt 22.

Although the suction grooves 68 are shown as interconnected by a manifold it is understood the grooves may fluidly communicate via a passageway 71 in the vacuum table 62, thereby avoiding the use of an external manifold.

The relief grooves 78 are located intermediate of the suction grooves 68. The relief grooves 78 have a width of approximately ¼ inch and a spacing of approximately 1/16 inch from an adjacent groove. Depending upon the belt material and the parameters of the sheet material, the relief grooves 78 may define a larger or smaller area than the suction groves 68 exposed to the belt 22. Specifically, in the present embodiment, an approximately 1/16 inch distance separates adjacent grooves in the vacuum table 62 and there are two relief grooves 78 for every suction groove 68. Therefore, the area of the belt 22 exposed to a suction pressure is less than the area of the belt exposed to a greater relief pressure.

In the present embodiment it is desirable to maintain consistent alignment between the belt 22 and the vacuum table 62 to keep the suction grooves 68 aligned with the vacuum apertures 32 in the belt. This alignment is facilitated by forming guide groove(s) 72 in the vacuum table 62 to receive a corresponding guide ridge 44 on the belt 22. In a preferred embodiment, a guide ridge 44 and groove 72 have a generally trapezoidal cross section. However, it is understood the cross sections may be any shape which assists alignment of the belt 22 and the table 62.

The vacuum generator 74 may be any of a variety of commercially available generators. The vacuum generator 74 is able to selectively create a reduced or negative pressure. Preferably, the amount of the reduced pressure is controllable. Further, the vacuum generator 74 has a sufficient capacity to provide the desired pressure differential across the entire working area of the vacuum table 62. A vacuum generator 74 that has been found satisfactory is HP8D, as manufactured by Cincinnati Fan & Ventilator Company, Inc.

The suction side of the vacuum generator 74 is fluidly connected to the suction area recess 66 and specifically the suction grooves 68. This connection may include manifold 70 or header so that each suction groove is operably connected to the vacuum generator. An exhaust of the vacuum generator 74 may be fluidly connected to the relief area recess 76 and specifically, the relief grooves 78. Preferably, the connection of the vacuum generator 74 to the suction grooves 68 and the relief grooves 78 can be regulated or controlled by valving and pressure control devices well known in the art. In a further embodiment, the pressure regulating devices are operably connected to the controller 90 so that an operator, or the controller can regulate the pressure differential exposed to the belt 22.

Cutting Assembly

The cutting assembly 80 includes a cutter 84, a gantry 86 and controller 90. The cutter 84 may be any of a variety of known cutters, such as wheels, blades, reciprocating blades, laser or water jet. The specific cutter 84 is chosen or employed in conjunction with the particular material to be cut and belt employed. In a present configuration, the cutter 84 is a wheel cutter and preferably a pair of parallel cutters.

The gantry 86 cooperates with the vacuum table 62 to translate the cutter 84 relative to the belt 22, as the belt passes over the vacuum table. The gantry 86 and cutter 84 are controlled by the controller 90 by means of software in a programmable computer 92. The computer 92 is any industry available computer having the software for directing the movements of the gantry and cutter.

Operation

As the belt 22 translates relative to the vacuum table 62, the belt occludes or at least overlies the suction and relief recess areas 68, 78, thereby isolating the respective recess from ambient pressure. In operation, it is desirable to apply as great a pressure differential as possible across the sheet material to be retained. This requires that the pressure differential is communicated through the suction grooves 68, across the belt 22 and hence to the sheet material to be retained. Therefore, the vacuum generator 74 is activated and regulated via the pressure regulator, if necessary, to create a sub ambient pressure in the suction grooves 68. The reduced pressure acts upon the sheet material on the belt 22 and retains the sheet material relative to the belt.

The relief channels 78 are simultaneously exposed to a pressure greater than the pressure in the suction grooves 68. This pressure may be sub ambient, ambient, or even a positive (greater than ambient) pressure. That is, by placing a positive pressure against a portion of the bottom side of the belt 22, a local upward force can be created on the belt. This local upward force further reduces the net downward force created by virtue of the suction channels 68.

It has been found that during operation of the vacuum table 62, an air flow may be created from a relief channel 78 to an adjacent suction groove 68. This air flow passes between the table contacting surface 26 of belt 22 and the belt supporting surface 64 of the vacuum table 62. To maintain a pressure in the relief grooves 78 that is greater than the pressure in the suction grooves 68, the vacuum table 62 is formed with the two relief grooves for each suction groove. Therefore, even if all of the air drawn through a suction groove 68 flows from adjacent relief grooves 78, as there are two relief grooves adjacent a suction groove, the pressure in the relief grooves remains greater than the pressure in the suction groove.

Therefore, the present method includes exposing a first portion of the moveable belt 22 to a sufficient first negative pressure to retain the sheet material on a supporting surface 24 of the belt; and simultaneously exposing a second portion of the belt to a pressure greater than the first negative pressure to reduce the net downward force on the belt resulting from the negative pressure. The sufficient negative pressure may be exposed to the underside of the belt 22 through suction area recesses 66 or grooves 68 and the greater pressure may be exposed to the underside of the belt through relief area recesses 76 or grooves 78.

It is desirable that the relief channels 78 are sized to permit sufficient ambient or positive pressure through the relief channels to permit a relatively free movement of the supporting surface 24 of the belt 22 relative to the vacuum table 62 during operation of the vacuum system.

The power requirements to translate the present belt with respect to the vacuum table 62 are substantially reduced by the use of the relief channels 78 as well as the guide ridge 44 and corresponding guide grooves 72. While prior belt systems employ tensioning rollers to create sufficient tension to align the belt and a table, the present mating guide ridges and grooves allow a reduced tension in the belt and hence a lower resistance to rotation of the belt.

Although the present invention has been described in terms of particular embodiments, it is not limited to these embodiments. Alternative embodiments or modifications which would be encompassed by the invention may be made by those skilled in the art, particularly in light of the foregoing teachings. Alternative embodiments, modifications or equivalents may be included in the spirit and scope of the invention, as defined by the claim.

What is claimed is:

1. A sheet material transport system, comprising:
   (a) a vacuum table having a belt contacting surface with a plurality of suction grooves and a relief groove intermediate the two suction grooves;
   (b) a belt operably connected to the vacuum table for contacting translation with respect to the belt contacting surface to simultaneously overlie the suction grooves and the relief groove; and (c) a vacuum generator fluidly connected to the suction grooves to reduce a pressure in the suction grooves below a pressure in the relief groove.

2. The sheet material transport system of claim 1, wherein the suction grooves and relief groove are disposed in parallel columns extending parallel to a direction of belt travel.

3. The sheet material transport system of claim 1, wherein the belt includes a plurality of vacuum apertures.

4. The sheet material transport system of claim 3, wherein the vacuum apertures are configured in a plurality of parallel columns extending parallel to a direction of belt travel relative to the vacuum table.

5. The sheet material transport system of claim 3, wherein the vacuum apertures have a first diameter adjacent the belt contacting surface of the vacuum table and a second smaller diameter spaced apart from the belt contacting surface.

6. A vacuum table for a sheet material transport system, comprising:

(a) a surface having two suction recesses and a relief recess, the relief recess disposed between the suction recesses;

(b) a belt translatable relative to the surface and in contact with a portion of the surface to overlie the suction recesses and the relief recess; and (c) a vacuum generator coupled to the suction recesses for creating a pressure differential between the suction recesses and the relief recess.

7. The vacuum table of claim 6, wherein the suction recesses and the relief recess are parallel grooves in the surface.

8. A method of releasably retaining a sheet material on a conveyor, comprising:

(a) creating a reduced first pressure in a first suction recess in a vacuum table surface and a second suction recess in the vacuum table;

(b) employing a second pressure in a relief recess in the vacuum table, the relief recess being disposed intermediate the first suction recess and the second suction recess, the second pressure being greater than the first pressure; and (c) translating a belt relative to the vacuum table to simultaneously overlie the first and the second suction recess, and the relief recess, the belt having sufficient porosity to communicate a portion of the first pressure to an upper surface of the belt.

* * * * *